Patented Sept. 14, 1948

2,449,184

UNITED STATES PATENT OFFICE 2,449,184

ORAL FLUORIDE-VITAMIN PREPARATION

Lyon P. Strean, Montreal, Quebec, Canada, assignor, by mesne assignments, to Ayerst, McKenna & Harrison Limited, New York, N. Y., a corporation of New York No Drawing. Application March 8, 1944,
Serial No. 525,591

3 Claims. (Cl. 167—55)

This invention relates to compositions of matter for use in oral therapy.

It is known that osteal structure may be rapidly laid down by a composition of matter known as fluor-apatite, which is in effect a combination of calcium, phosphorus and fluorine. This compound is only available naturally to residents of those localities where the water supply presents readily ingested amounts of fluoride. For instance, in Deaf Smith County, Texas, the drinking water is high in fluoride content, and the population enjoys relative freedom from the necessity of repeated changes of artificial dentures. This particular county is unique in that in most other localities where the water is deficient in fluoride content, exactly the opposite condition exists. It has also been noted that the incidence of dental caries in the Texas county referred to is much lower than in other localities. The same is generally true with regard to the prevalence of rickets.

I have discovered compositions of matter which when administered orally in the form of a lozenge, tablet or the like will set up a condition in the oral cavity by which apatite is laid down rapidly not only upon the bone structure but in addition upon teeth normally subject to caries, thereby to overcome the bone atrophy normally to be expected and at the same time lower the incidence of dental caries. My invention is not limited to the formation of apatite alone, but utilizes the synergistic action of certain vitamins to enhance the action of fluorides in the formation of fluor-apatite.

I have discovered that compositions according to the invention, used as prescribed, have the effect of preserving the normal structure of bone and inhibiting dental caries to a surprising extent. In the case of fully erupted teeth, the inhibition of dental caries is not a true metabolism, but comprises the adsorption by the teeth enamel of fluor-apatite.

The frequency of use of the tablets of this invention is prescribed in accordance with their composition. For instance, one tablet or lozenge per day of the formulae of the examples may be prescribed. They are preferably chewed, sucked, or otherwise dispersed in the mouth so that substantially complete dissolution of the material occurs in the mouth.

With this concept in view, the invention consists in the compositions of matter hereinafter set forth and for the purposes related.

A preferred composition comprises calcium fluoride, vitamin C and vitamin D. The amount of calcium fluoride should be close to the effective minimum. The applicant prefers to use in a tablet between about 2 milligrams and about 4 milligrams of calcium fluoride (representing between about 1 and about 2 parts per million of fluorine in water, on the basis of drinking six glasses of water, i. e. one liter per day). Vitamin C as ascorbic acid is preferably employed at about 30 milligrams and vitamin D, as calciferol, at about 400 units. These concentrations represent a daily effective amount which may vary with different individuals.

EXAMPLES

In order to explain more specifically the preparation of compositions according to the invention a particular example is given as follows. It will of course be understood that the data given are illustrative only and not to be taken in a limiting sense.

Example 1

A typical composition, sufficient for a batch of 10,000 daily-dose tablets, according to the invention, was prepared from the following constituents in substantially the amounts stated:

| | | |
|---|---|---|
| Calcium fluoride | grams | 40 |
| Ascorbic acid | do | 300 |
| Vitamin D concentrate as calciferol | do | 12.5 |
| Lactose | pounds | 1 |
| Starch | ounces | 7.5 |
| Powdered acacia | grams | 320 |
| Tartrazine | do | 12 |

The composition was prepared by mixing the calcium fluoride with the lactose and acacia, the latter materials acting as a flavoring agent and a binder respectively. The ascorbic acid was mixed with the starch, the vitamin D (a concentrate made up of about .125 gram of calciferol dissolved in about 12½ grams of hydrogenated peanut oil) was dissolved in gasoline and added to the mixtures of the other constituents. The tartrazine, acting as a dye, was dissolved in a minimum amount of water and granulated with the starch paste. The granulated material was dried at a moderate temperature and the granulation broken, sieved and 10,000 daily-dose tablets punched out from it.

These tablets had the effects desired and disclosed herein.

NOTE.—In lieu of lactose, other sugars may be used such as glucose, maltose, saccharose, with the resultant adjustment of the acacia. In lieu of acacia, gum tragacanth or other suitable binding agents may be used. Other amylaceous substances may be substituted for the starch as a binder for the ascorbic acid.

Example 2

A composition was prepared substantially in accordance with Example 1, with the exception that sodium fluoride was substituted for calcium fluoride. Tablets made from this composition, substantially in accordance with Example 1, had the effects desired.

Example 3

A typical composition, sufficient for a batch of 10,000 daily-dose lozenges, according to the invention, was prepared from the following constituents in substantially the amounts stated.

| | |
|---|---|
| Calcium fluoride | 40 grams |
| Ascorbic acid | 300 grams |
| Calciferol (vitamin D) (dissolved in 12½ grams hydrogenated peanut oil) | 0.125 gram |
| Powdered acacia | 12 ounces |
| Powdered sugar | 12 pounds, 12 ounces |
| Tartrazine dye, g. s. | 60 grains to colour yellow |

Flavour

This composition was granulated with water and made into 10,000 daily-dose lozenges, each weighing approximately 10 grains. Each lozenge contained approximately 4 mgs. of calcium fluoride and 30 mgs. of ascorbic acid and 400 international units of vitamin D.

These lozenges were found to have the effects desired and disclosed herein.

Example 4

A composition was prepared substantially in accordance with Example 3, with the exception that sodium fluoride was substituted for calcium fluoride. Lozenges made from this composition had the effects desired.

Modifications

The compositions according to the invention may be modified. For instance, while the invention has been described principally in terms of calcium fluoride, other alkali earth metal fluorides compatible with the process of the present invention may be used. The concentrations are approximately the same as those for calcium fluoride. Other materials capable of enhancing the action of the fluoride by synergism to form fluorapatite may be substituted for the ascorbic acid and vitamin D. Vitamin D has been prescribed as calciferol but other forms of vitamin D may be suitably employed. It will also be understood that the vehicle in which the compositions are embodied to render them suitable for oral reception permits of variation.

I claim:

1. A dosage unit for topical oral therapy of exposed erupted caries-susceptible teeth, consisting of a lozenge adapted to be dissolved slowly in the saliva of the mouth, whereby the inner mouth surfaces including the surfaces of exposed erupted teeth are bathed with saliva containing dissolved constituents of the lozenge, said lozenge containing a major amount of excipients and a minor amount of active ingredients, said active ingredients comprising ascorbic acid, vitamin D and an amount of a fluoride selected from the group consisting of calcium fluoride and sodium fluoride not in excess of about 4 milligrams.

2. A dosage unit as defined in claim 1, in which the fluoride is calcium fluoride.

3. A dosage unit as defined in claim 1, in which the fluoride is sodium fluoride.

LYON P. STREAN.

REFERENCES CITED

The following references are of record in the file of this patent:

Journal of the American Pharmaceutical Association, Feb. 1947, Practical Pharmacy edition, pages 89, 90.

East, American Journal of Diseases of Children, vol. 64, pages 867 to 871 (November 1942).

Dierks, Chemische Zentralblatt, 1943, II, page 1892.

Mann, Medical Clinics of North America, vol. 27, page 545 (March 1943).

McCollum, Nature, vol. 147, page 104 (1941).

Cox et al., Journal of Dental Research, pages 483, 484.

Pandit et al., Chemical Abstracts, vol. 35, page 6660 (1941).